Figure 1:
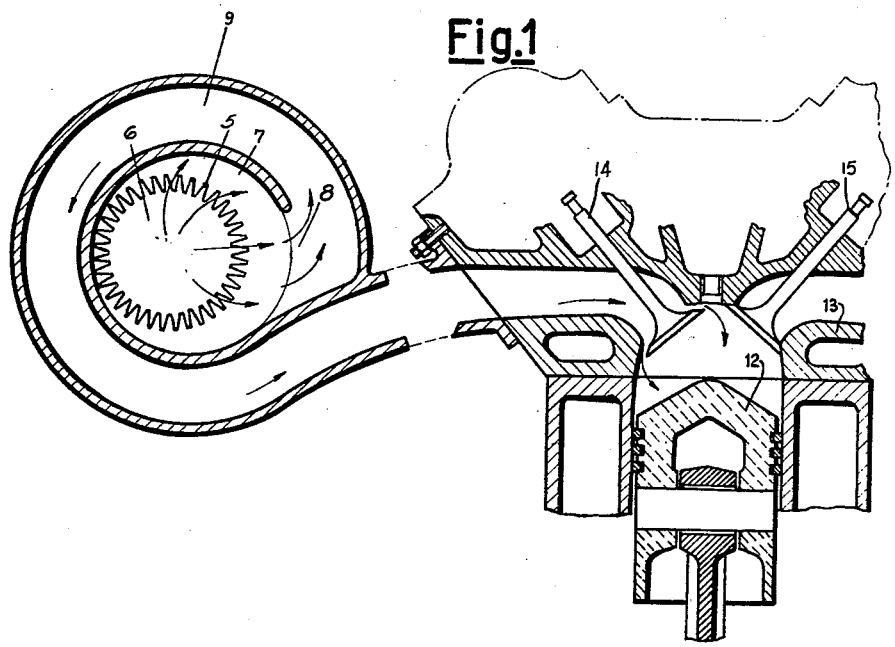

April 13, 1965     G. GARCEA     3,177,854

RESONANCE INDUCTION DEVICE FOR INTERNAL-COMBUSTION ENGINES

Filed Jan. 28, 1964     2 Sheets-Sheet 1

United States Patent Office 3,177,854
Patented Apr. 13, 1965

3,177,854
RESONANCE INDUCTION DEVICE FOR
INTERNAL-COMBUSTION ENGINES
Giampaolo Garcea, Milan, Italy, assignor to Alfa Romeo
S.p.A., Milan, Italy, a company of Italy
Filed Jan. 28, 1964, Ser. No. 340,596
Claims priority, application Italy, Mar. 5, 1963, 4,710/63
5 Claims. (Cl. 123—52)

It is known how in a free-induction internal-combustion engine, that is not supercharged, filling of the cylinder may be increased by using resonance phenomena based upon the existence of pressure waves in the induction pipes of the engine itself. Increased filling and thus volumetric yield, involves, as known, increased power in the engine; the various manufacturers have therefore carried out theoretical studies and accurate bed tests to determine the length and area of the induction pipe section such as to improve the power characteristics in relation to predetermined rotation rates. However, it is known how increased filling generally takes place only if the pipes, having a suitable section and length, are as many as the engine cylinders and separated from each other; in relation to the need of filtering the sucked air and effect silencing upon induction, obviously location upstream of said pipes of as many filters and silencers as are the pipes themselves, is avoided; for the purpose a capacity (or header) of suitable dimensions in which the air sucked at the outside enters after having crossed a single filter and a single silencer (generally provided in a single element having both functions) is used; from the capacity the air enters in parallel in the various pipes corresponding to the single cylinders, the mouthpiece of the same pipes being connected to the capacity. The various tubes corresponding to the single cylinders, the header, the air filter and silencer, naturally must be housed in the engine space; and this is not always possible particularly when the most suitable length for the sake of filling the single pipes (corresponding to the various cylinders) is substantial.

It is the object of the present patent application an induction device for internal-combustion engines having a plurality of cylinders in line, device which, in most cases, solves the abovementioned problem of dimension and simultaneously the one of compactness. In fact, one of the characteristics of the invention is to have an induction capacity (or header) of elongated cylindrical shape and located parallel to the engine head, with a length approximately equal to the length of the head itself; the various induction pipes connecting the abovementioned capacity with the head encircling the capacity so that their development may easily be the one desired with an overall dimension greatly reduced.

Such a characteristic, however, does not completely solve the problem, because in practice the pressure losses to which the sucked air is subject through the device, appear to be greater than the ones suffered by the air itself in a traditional device. However, further theoretical studies and practical experiences have permitted to ascertain that the greatest pressure loss mentioned above, is not due to the major curvature of the pipes, but to the fact that the pipes themselves, whenever it is desired to reduce the dimensions, have the mouthpiece tangentially located with respect to the cylindrical surface itself: suction of air according to this direction of the mouthpiece obviously gives rise to excitation of a swirl coaxial to the cylindrical capacity; according to the swirl law the velocities induced in the air in the area close to the axis are very high; and it is the building up of such velocities which entails the abovementioned load loss.

It is therefore an essential characteristic of the device object of the present invention, to provide the cylindrical capacity from which lead the various pipes connecting the various cylinders, with baffle means adapted to avoid swirl formation in the air sucked.

Said baffle means may take up various shapes, some of which are illustrated in the accompanying drawings. According to a preferred embodiment of the shielding function, the same air filtering element may be used; for example by making it of cylindrical shape with a length equal to that of the capacity but with the outside diameter smaller than the inside diameter of the capacity so as to be arranged eccentrically, so that the two cylindrical surfaces be tangent in the opposite area to the mouthpiece of the single pipes. Another characteristic of the device subject of the present patent application, aiming to solve the dimension, lightness and cost problems, is the one relating to the location of the resonant chambers for the provision of the acoustic filter for the engine induction noise: said resonant chambers are also arranged around the induction header or capacity, in the spaces available between the single induction pipes (already encircling the capacity itself, at a given distance from one another); in such a way the device has the outward appearance of a single cylindrical element comprising the single induction pipes of desired length, the capacity or header, the air filter and the acoustic filter.

In the case where the internal-combustion engine is an explosion engine, power adjustment as known being effected by choking the air admission by means of a valve or throttle connected with the accelerator pedal, said choking valve or throttle may be located upstream of the device object of the present invention; conversely, however, there may be located as many throttles as is the number of cylinders; in such a case these valves (or throttles) are inserted in the single pipes closely to the connection with the engine head.

If the explosion motor is provided with one or more carburetors, the arrangement of the carburetor or carburetors will be in registry with the choking valves mentioned above (usually included in the carburetor body); if instead, the explosion engine is of the injection type, the injectors will be placed either in the pipes in proximity of the head or even in the head itself. Naturally also the case in which the internal-combustion engine is an engine of the diesel type is foreseen; particularly in the case of light diesel for high r.p.m. motor traction the resonance phenomena in the induction pipes may be used.

Figure 2:
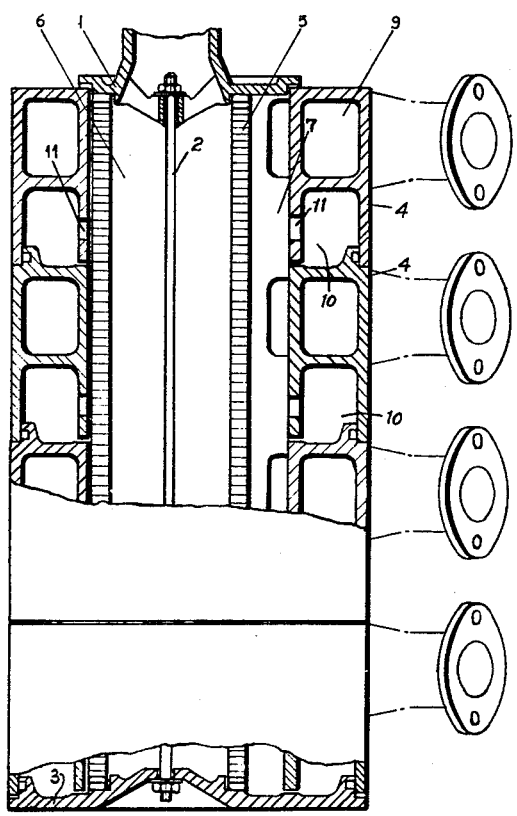
Figure 3:
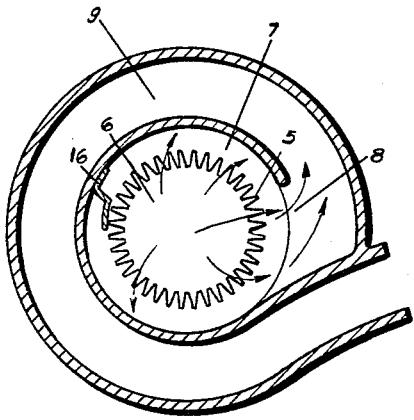
Figure 4:
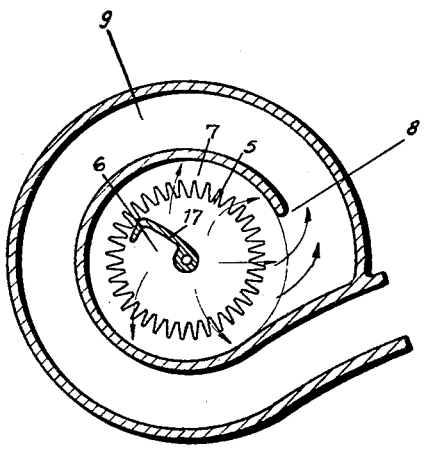
Figure 5:
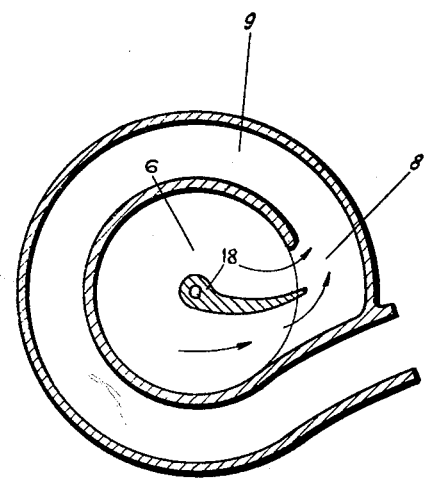

By way of example and not in a limitative sense, in the accompanying drawing in FIGURE 1 is shown a cross section of the device and internal-combustion engine to which it is directly or indirectly connected; in FIGURE 2 is shown instead a longitudinal section of the device. In FIGURES 3, 4, 5 are shown variations.

With particular reference to FIGURES 1 and 2, the air and mixture for feeding the internal-combustion engine, enters the device in correspondence with the appropriate aperture provided in cover 1. The tie rod 2 which connects cover 1 with the other end cover 3 serves to lock with each other the various cylindrical elements 4 (as many as are the engine cylinders) and the fabric or filtering cloth element 5. The air or mixture enters through the cover aperture 1 travels along a more or less long distance of cylindrical cavity 6 inside the filter 5; then crossing filter 5 it arrives in cavity 7 included between said filter 5 and the cylindrical inner surface of the various elements 4. The air or mixture enters through opening 8 in the single induction pipes 9 corresponding to the various cylinders; said induction pipes, of suitable length to use the resonance phenomena, are provided inside the elements 4 and their length develops mainly circumferentially inside the elements themselves so as to reduce the dimensions. As it appears from the sections in FIGURE 1 and in FIGURE 2 in the particular embodiment shown, the harmful swirl build up inside the capacities 6 and 7 is hindered due to the particular location of the air filter 5 the outside surface of which is tangent to the outside cylindrical surface of capacity 7 along the generatrix approximately opposite to the one corresponding to which, apertures 8 are provided.

In elements 4 the spaces comprised between the cylindrical lengths of the various pipes 9 are used so as to provide, without increasing the dimensions, the resonant closed capacities 10 which communicate with capacity 7 through suitable holes 11. From conduits 9 the air is sucked during the piston induction stroke through the normal conduits provided in head 13 equipped with the inlet valve 14 and discharge valve 15.

In FIGURES 3 and 4 are shown two other embodiments of the device with filtering element 5 coaxial to the cylindrical capacity 6: harmful swirl build up is hindered by the presence, in the example of FIGURE 3, of baffle 16 applied along the generatrix approximately opposite to the one corresponding to which the apertures 8 are provided, while in the example of FIGURE 4 due to the presence of baffle 17 placed inside the filtering element 5, but still at the portion approximately opposite to the one of apertures 8.

In FIGURE 5 is shown an embodiment of the device without filtering element: the harmful swirl build up is thus hindered by the presence of baffle 18 applied inside the cylindrical cavity 6 at the side of apertures 8.

I claim:

1. A resonance induction device for internal-combustion and free-induction engines having a plurality of cylinders in line, characterized in that it comprises essentially a cylindrical capacity of elongated shape, located parallel to the engine head, along a generatrix of said cylindrical capacity being located the mouthpieces of single pipes connecting the capacity with the various cylinders of the engine, the pattern of said connection pipes being such that they encircle the abovementioned capacity so that the axis of said pipes in correspondence with the mouthpiece lies in a plane normal to the cylindrical capacity axis and has a tangential pattern with respect to the cylindrical surface itself; further comprising means provided to hinder build up in said cylindrical capacity of a swirl having an axis parallel to the one of the capacity itself; further comprising an engine induction acoustic filter consisting of resonant cavities encircling the outside of the cylindrical capacity in the space between the single pipes also encircling the cylindrical capacity itself.

2. Device as claimed in claim 1, in which the permeable surface of the filter provided for the air impurities is used as baffle to hinder swirl build up, said surface being located inside the cylindrical capacity.

3. Device as claimed in claim 2, characterized in that the permeable surface of the filter is located eccentrically and tangent inside the cylindrical capacity.

4. Device as claimed in claim 2, characterized in that the permeable surface of the filter is located concentrically inside the capacity, a baffle being interposed between the capacity and the filter, or a baffle between the axis and the filter along a generatrix approximately opposite to the one in correspondence to which the apertures are located.

5. Device as claimed in claim 1, characterized in that inside the cylindrical cavity a baffle is located radially in correspondence to the generatrix along which the apertures are located.

References Cited by the Examiner

UNITED STATES PATENTS

| 1,379,329 | 5/21 | Bachle | 123—52 |
| 1,641,527 | 9/27 | Brewer | 123—52 |
| 1,893,502 | 1/33 | Kuehn | 123—52 |
| 2,704,055 | 3/55 | Downing | 123—52 |
| 2,835,235 | 5/58 | Gassmann | 123—52 |

RICHARD B. WILKINSON, *Primary Examiner.*

KARL J. ALBRECHT, *Examiner.*